United States Patent
Anning

(10) Patent No.: US 7,237,751 B2
(45) Date of Patent: Jul. 3, 2007

(54) HELICOPTER ROTOR AND METHOD OF REPAIRING SAME

(75) Inventor: Bruce D. Anning, Winnipeg (CA)

(73) Assignee: Advanced Composite Structures Inc., Winnipeg (CA)

( * ) Notice: Subject to any disclaimer, the term of this patent is extended or adjusted under 35 U.S.C. 154(b) by 254 days.

(21) Appl. No.: 10/987,184

(22) Filed: Nov. 15, 2004

(65) Prior Publication Data

US 2005/0169763 A1 Aug. 4, 2005

Related U.S. Application Data

(63) Continuation-in-part of application No. 10/326,995, filed on Dec. 24, 2002, now abandoned.

(51) Int. Cl.
*B64C 3/20* (2006.01)
(52) U.S. Cl. ................ 244/123.3; 244/117 R
(58) Field of Classification Search ............ 244/123.2, 244/123.3, 123.1, 117 R, 133, 134 D, 134 B
See application file for complete search history.

(56) References Cited

U.S. PATENT DOCUMENTS

| | | | |
|---|---|---|---|
| 2,475,121 A * | 7/1949 | Avery | 416/114 |
| 2,961,053 A * | 11/1960 | Prewitt et al. | 416/226 |
| 4,323,332 A | 4/1982 | Fradenburgh | |
| 4,415,615 A | 11/1983 | Esmay et al. | |
| 4,580,944 A | 4/1986 | Miller | |
| 5,108,262 A | 4/1992 | Crane | |
| RE34,173 E * | 2/1993 | Kerber | 428/610 |
| 5,542,820 A | 8/1996 | Eaton et al. | |
| 6,106,235 A | 8/2000 | Tettenbon et al. | |
| 6,194,685 B1 * | 2/2001 | Rutherford | 219/201 |
| 6,341,747 B1 | 1/2002 | Schmidt et al. | |
| 6,506,494 B2 | 1/2003 | Brandys et al. | |

* cited by examiner

*Primary Examiner*—Timothy D. Collins
(74) *Attorney, Agent, or Firm*—Ryan W. Dupuis; Adrian D. Battison; Michael R. Williams

(57) ABSTRACT

An aerofoil, particularly a helicopter main rotor blade has a leading edge protector comprising a strip of resilient polymer, preferably polyurethane, adhered to the leading edge of the flex section of the blade.

20 Claims, 4 Drawing Sheets

HELICOPTER ROTOR AND METHOD OF REPAIRING SAME

This application is a continuation-in-part application of the parent application, Ser. No. 10/326,995, filed Dec. 24, 2002 now abandoned which is still pending.

FIELD OF THE INVENTION

The present invention relates to aerofoils, and more particularly to the protection of aerofoil leading edges from erosion damage. The invention has particular application to rotary wings, for example helicopter rotor blades.

BACKGROUND

The invention was developed in the environment of helicopter rotor blade repair, and will be described primarily in connection with that application. It will be understood by those knowledgeable in the art that the invention may have wider application to aerofoils for other purposes.

A typical helicopter rotor blade has an inboard mounting end including a suitable fitting used to mount the blade on the rotor hub of an aircraft. As understood by skilled persons in the art of rotor blades, an aerofoil portion of the blade typically spans from the inboard end section to the blade tip and includes a flight section and a flex section. The flight section which is farthest from the axis of rotation travels at the greatest speed and provides the majority of the lift. Inboard from the flight section is the flex section which undergoes bending deflection under lift forces exerted on the blade in use. In a conventional rotor blade design the flex section is continuous in profile and formed of similar material as the outboard flight section so as to have similar rigidity. The flex section generally comprises a center spanwise working section of the blade. On conventional blades, a trim tab is typically located at the trailing edge to ensure that the blades track one another. The trim tab is commonly located at a transition point on the blade at which flexing of the blade is substantially reduced in operation, such that the flex section is typically defined as the portion of the blade which spans between the inboard end section and the trim tab.

The leading edges of helicopter rotor blades are subject to environmental wear, particularly when the helicopter is operated in harsh conditions, for example with significant quantities of ambient sand or salt. It has been found in particular that there is a recurring problem of skin erosion located inboard of the metal leading edge abrasion strips in main rotor blades. Current practice is to remove the blades from the helicopter and send them for repair. In some cases, the damage cannot be repaired. The damage requires skin repairs to the leading edge with reinforcement doublers applied. It has been found that a metal skin repair in the flex section of the blade is prone to delamination.

Impact damage is another significant concern with rotor blades since impact damage to the blade also requires removal of the blade and shipping to specialized shop capable of performing the repairs.

Either repair, of erosion or impact damage can mean several weeks downtime for the aircraft while the blade is dismounted, packed and shipped, repaired and returned.

U.S. Pat. No. 4,580,944 to Miller discloses a flexible rotor connector for a rotary wing aircraft in which a flexible aerodynamic foam covering is then applied to this flexible rotor connector. A moisture resistance polyurethane coating is recommended primarily to protect the flexible aerodynamic foam covering from moisture damage. The primary purpose of the flexible rotor connector is to provide a means of attaching the rotor blade component to the helicopter rotor head drive/control systems and therefore does not form a part of the rotor blade component whatsoever. Due to the underlying foam, the rubber coating is clearly not intended to protect against any impacts. The only impact resistant coverings known in the prior art specifically for the leading edge of a rotor blade, involve a metal strip laminated to the leading edge. Miller in particular discloses no form whatsoever of a wear resistant strip on the blade itself.

The present invention is concerned with an alternative arrangement that ameliorates many of the problems with current repair techniques for aerofoil leading edges.

SUMMARY

According to one aspect of the present invention there is provided a rotor blade for a rotating wing aircraft, the rotor blade having an inboard end section for attachment to the aircraft, an outboard flight section adjacent an outboard tip end of the rotor blade, and a flexible blade section between the inboard end section and the outboard flight section of the rotor blade, a wear resistant polymeric material being applied to the leading edge of only the flexible blade section.

Accordingly, a wear resistant metal strip is preferably applied to the leading edge of only the outboard flight section.

The flex section, upon which the wear resistant polymeric material is applied, typically comprises a centre spanwise working section which is continuous in profile and formed of similar material as the outboard flight section. In conventional helicopter blades, the flex section typically spans between the inboard end section and a trim tab supported on the blade as the trim tab is typically located at a transition point on the blade at which flexing of the blade is substantially reduced in operation.

The polymeric leading edge has been found to provide good resistance to erosion. It has been found to be particularly effective in the flex section of helicopter main rotor blades as the flexibility of the material limits any tendency to delaminate as occurs with rigid metal leading edge repairs in this section of the blade. On the other hand, it is to be noted that when used in the outboard flight section of a helicopter rotor, the high centrifugal forces on the polymer may cause creep of the material, leading to the polymer disengaging off the end of the blade. In consequence, the polymer leading edge is, in this environment, preferably limited to the flex section of the blade, with the flight section being equipped with a conventional metal leading edge.

Minor impact damage to a polymeric leading edge can readily be repaired in the field rather than dismounting the blade and shipping it away for repair, as would be the case with damage to a conventional leading edge.

According to another aspect of the present invention there is provided a method of repairing a rotor blade for a rotating wing aircraft from erosion, the rotor blade having an inboard end section for attachment to the aircraft, an outboard flight section adjacent an outboard tip end of the rotor blade, and a flexible blade section between the inboard end section and the outboard flight section of the rotor blade, the method comprising:

identifying the flexible blade section of the blade; and securing a wear resistant polymeric material to the leading edge of only the flexible blade section.

The method may include removing an existing wear resistant metal strip of the blade from only the flexible blade section prior applying the wear resistant polymeric material to the blade.

Identifying the flexible blade section of the blade may comprise identifying a section of the blade which spans substantially between the inboard end section and a trim tab supported on the blade.

The installation of the polymeric leading edge is much more easily performed than the installation of a metal leading edge. It conforms more closely to the blade configuration since the metal edge is conventionally shaped using a brake, forming a sequence of substantially flat segments only approximating the smooth, uniform curvature of the original blade.

The resilient polymer is preferably an elastomeric material, for example polyurethane. The currently preferred material is ether urethane 85 Shore A polyurethane, desirably black in colour with a matte finish and UV stabilized. It is preferably bonded to the leading edge skin using an adhesive and with a bond line thickness control medium. This may be a scrim cloth.

The currently preferred adhesive is an epoxy adhesive, Hysol EA 9309.3NA containing 5-mil glass beads for bond line thickness control. It is preferably cured at an elevated temperature, with a uniform pressure applied over the polyurethane.

BRIEF DESCRIPTION OF THE DRAWINGS

In the accompanying drawings, which illustrate an exemplary embodiment of the present invention.

DETAILED DESCRIPTION

Figure 1:
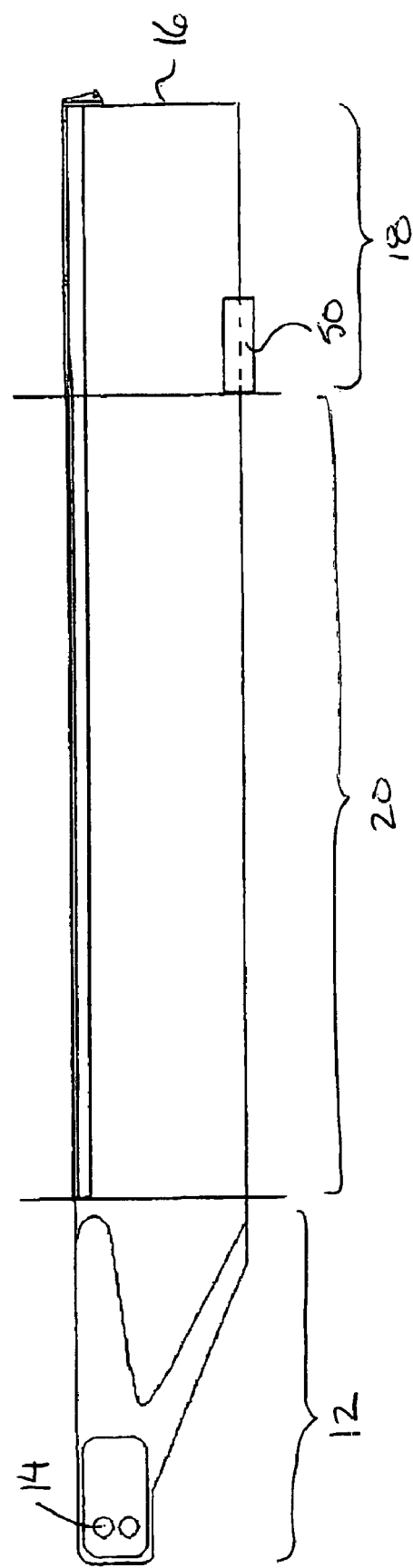
FIG. 1 is a plan view of a prior art helicopter rotor blade.

Referring to the accompanying drawings, there is illustrated a blade 10 for use in a helicopter main rotor. The blade has a mounting end 12 carrying a mounting fitting 14 which is used to mount the blade on the rotor hub of the aircraft. The opposite end of the blade is the blade tip 16. That section of the blade adjacent the tip is the flight section 18 which, because it is furthest from the axis of rotation, travels at the greatest speed and provides the majority of lift. Inboard of the flight section, 18 is the flex section 20 which, in use, undergoes bending deflection under the lift forces exerted on the blade.

Figure 3:
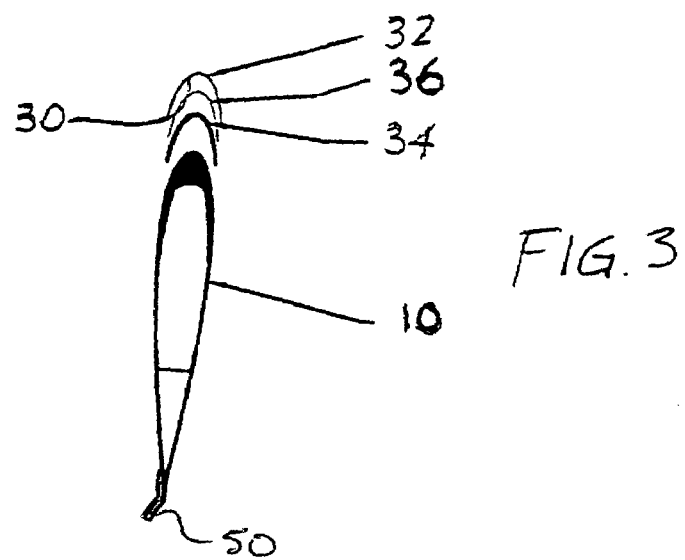
FIG. 3 is an exploded section along line II-II of FIG. 2.
Figure 4:
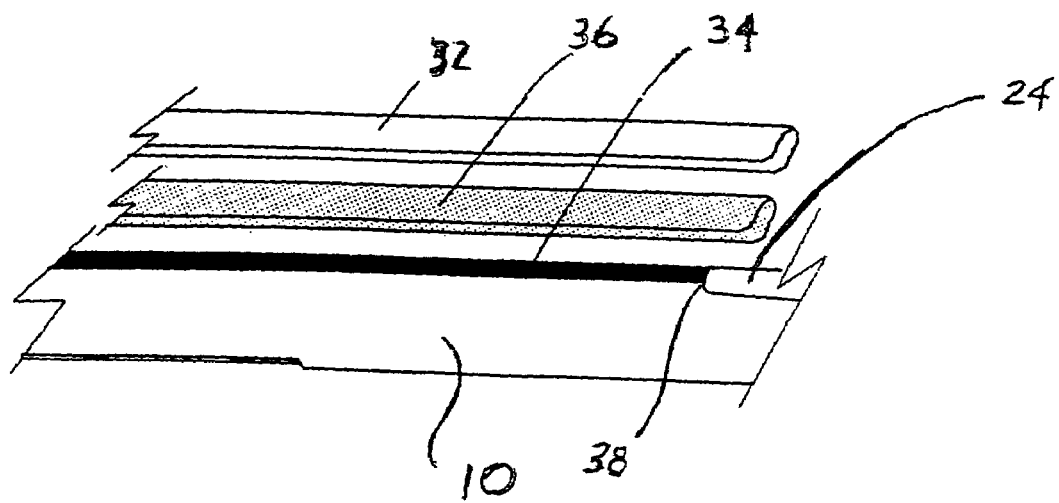
FIG. 4 is an exploded isometric of a leading edge repair.

The entire blade has an aerofoil shape as shown most particularly in FIG. 3.

The leading edge 22 of the blade is subject to erosion during use. The erosion is most pronounced in the flight section where the speed of the blade is highest. To limit erosion in the flight section, the rotor is equipped with an erosion strip 24. When wear of the erosion strip reaches an unacceptable level, it is removed and replaced. With the present invention, For leading edge wear inboard of the erosion strip, the worn skin of the rotor is abraded and cleaned and equipped with a polyurethane leading edge strip 26 as edge protection.

EXAMPLE

With the illustrated blade 10, the repair area of the blade is marked off. It is then abraded and cleaned with an appropriate solvent.

The bonding surface 30 of a polyurethane strip 32 is also abraded and cleaned with a solvent.

Adhesive 34 is applied to the abraded bonding surfaces of the blade and the polyurethane strip.

A scrim cloth 36, in this case 0.008 inch (00.2 mm.) nylon is positioned smoothly over the repair area, leaving no wrinkles or creases.

The polyurethane strip 32 is then positioned on the repair area over the scrim cloth and subjected to a uniform pressure of 15 psi ($10^5$ N/m$^2$) and an elevated temperature (e.g. 180° F. (82° C.) for a duration sufficient to cure the adhesive. It has been found that good conformity to the original shape of the blade and uniform adhesion are achieved through the use of a pressurized bladder acting on the outer surface of the polymeric sheet during curing of the adhesive.

This produces the polyurethane leading edge protector 26 in the flex section, abutting the metal edge protection used in the flight section at a junction 38 where the inner edge of the metal sheet of the flight section edge protection 24 provides a surface against which the outboard edge of the polyurethane sheet 32 engages, to support the polyurethane sheet against creep owing to the centrifugal force that is generated during operation of the blade.

Figure 2:
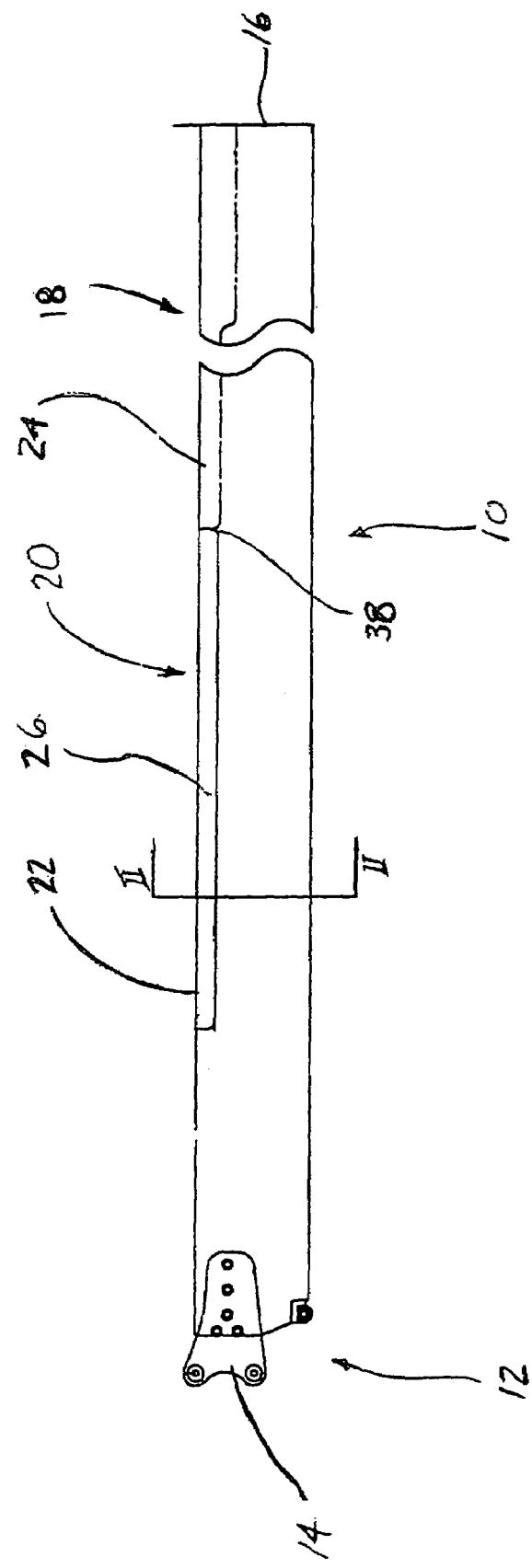
FIG. 2 is a plan view of a helicopter rotor blade.
Figure 5:
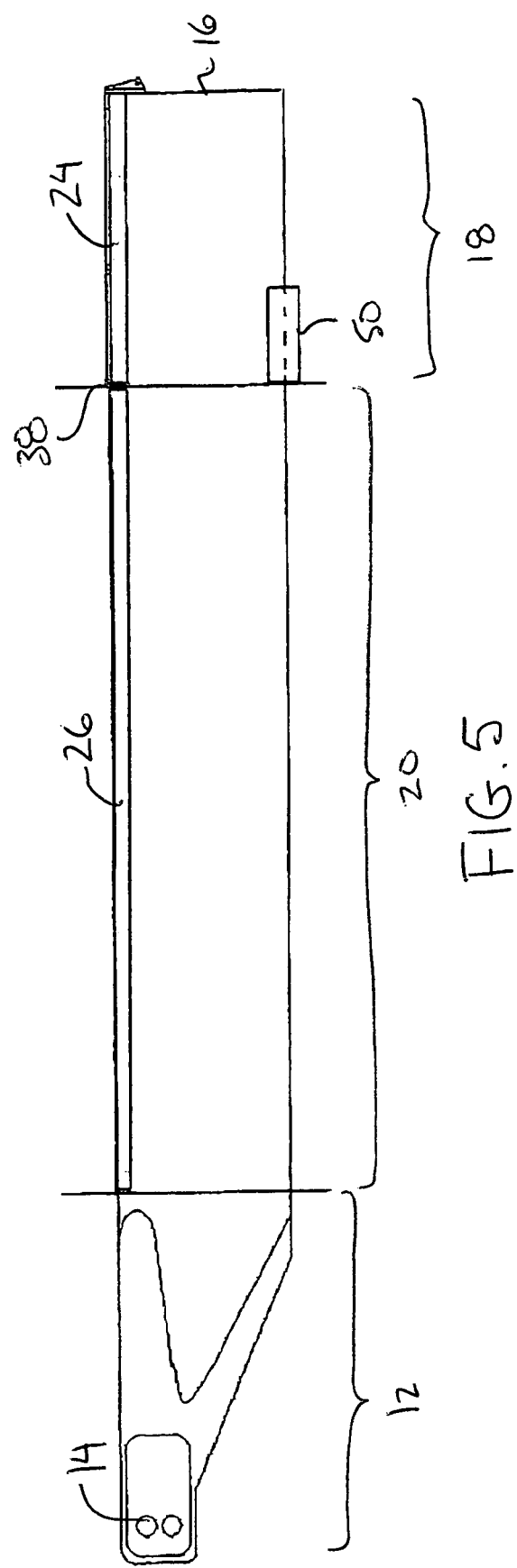
FIG. 5 is a plan view of a further embodiment of a helicopter rotor blade.

Turing now to FIG. 5 the polyurethane strip 32 is again shown supported on the leading edge of the flex section of a conventional rotor blade, but of a blade differing somewhat in configuration from that of FIG. 2. The wear resistant polyurethane material is applied in the same manner to the rotor blade of FIG. 5 as in the previous embodiment.

The blade of FIG. 5 is similar to that of FIG. 2 in that both are configured similarly to a conventional rotor blade having an inboard end section 12 for mounting on the rotor hub and an aerofoil portion including a flex section 20 and a flight section 18 outboard from the flex section. The flex section and flight section are continuous in profile with one another and formed of similar material so as to have similar rigidity to one another as in conventional rotor blades. The flex section thus generally comprises a center spanwise working section of the blade which spans substantially between the inboard end section 12 and a trim tab 50 supported at a trailing side of the blade. The trim tab 50 in this instance is located at a transition point where flexing of the blade is substantially reduced in operation so as to define the transition point between the flex section and the flight section similarly to conventional rotor blades.

The polyurethane strip 32 can be installed on new blades or can be used to repair old blades. In either instance the first step is to identify the flex section 20 either by locating the trim tab or the transition point where flexing of the blade in use is substantially reduced. In the event that there is already an existing metal strip at the leading edge, the metal is removed only at the flex section with a metal strip being kept or replaced with a new metal strip at the outboard flight section 18. The flight section on the main rotor blades of a typical small passenger helicopter is usually in the range of two to four feet. The polyurethane strip 32 then applied only to the flex section with an outer edge being abutted against the inner sedge of the metal strip on the flight section at the junction 38.

While one particular embodiment of the present invention has been described in the foregoing, it is to be understood that other embodiments are possible within the scope of the appended claims. Thus, while the present invention has been described in connection with its application to helicopter main rotor blades, it is to be understood that the invention has application to other aerofoils that require edge protection. Examples may include the wings of fixed wing aircraft and the leading edges of aircraft propellers. The invention is therefore to be considered limited solely to the scope of the appended claims.

Embodiments of the invention in which an exclusive property or privilege is claimed are defined as follows:

1. A rotor blade for a rotating wing aircraft, the rotor blade having an inboard end section arranged for attachment to the aircraft, an outboard flight section adjacent an outboard tip end of the rotor blade and which is arranged to provide lift when rotated, and a flexible blade section between the inboard end section and the outboard flight section of the rotor blade and which is arranged to undergo bending deflection in use, the flexible blade section being continuous in profile and formed of material having substantially the same rigidity as the outboard flight section and a wear resistant polymeric material being applied to the leading edge of only the flexible blade section between the inboard end section of the blade and the outboard flight section of the blade.

2. A rotor blade according to claim 1 wherein the polymeric material is an unreinforced elastomer.

3. A rotor blade according to claim 2 wherein the polymeric material is polyurethane.

4. A rotor for a rotating wing aircraft, the rotor blade having an inboard end section arranged for attachment to the aircraft, an outboard flight section adjacent an outboard tip end of the rotor blade and which is arranged to provide lift when rotated, and a flexible blade section between the inboard end section and the outboard flight section of the rotor blade and which is arranged to undergo bending deflection in use, a wear resistant metal strip being applied to the leading edge of only the outboard flight section and a wear resistant polymeric material being applied to the leading edge of only the flexible blade section between the inboard end section of the blade and the outboard flight section of the blade such that an outboard edge of the polymeric material is abutted against an inner edge of the metal strip.

5. A rotor blade according to claim 1 wherein the wear resistant polymeric material is applied directly to the substrate skin of the leading edge of the flexible blade section.

6. A rotor blade according to claim 1 wherein the wear resistant polymeric material is applied with an epoxy adhesive.

7. A rotor blade according to claim 4 wherein the flexible blade section, upon which the wear resistant polymeric material is applied, is continuous in profile and formed of similar material as the outboard flight section.

8. A rotor blade according to claim 1 wherein the flexible blade section, upon which the wear resistant polymeric material is applied, comprises a centre spanwise working section of the blade.

9. A rotor blade according to claim 1 wherein the flexible blade section, upon which the wear resistant polymeric material is applied, spans substantially between the inboard end section and a general area of the blade supporting a trim tab thereon.

10. A rotor blade for a rotating wing aircraft, the rotor blade having an inboard end section arranged for attachment to the aircraft, an outboard flight section adjacent an outboard tip end of the rotor blade and which is arranged to provide lift when rotated, and a flexible blade section between the inboard end section and the outboard flight section of the rotor blade and which is arranged to undergo bending deflection in use, a wear resistant polymeric material being applied to the leading edge of only the flexible blade section between the inboard end section of the blade and the outboard flight section of the blade, wherein the flexible blade section, upon which the wear resistant polymeric material is applied, spans substantially between the inboard end section and a location on the blade in which flexing of the blade is arranged to be substantially reduced in operation.

11. A method of repairing a rotor blade for a rotating wing aircraft from erosion, the rotor blade having an inboard end section for attachment to the aircraft, an outboard flight section adjacent an outboard tip end of the rotor blade, and a flexible blade section between the inboard end section and the outboard flight section of the rotor blade, the method comprising:

identifying the flexible blade section of the blade by identifying a section of the blade which spans substantially between the inboard end section and a general area of the blade where a trim tab is supported on the blade; and securing a wear resistant polymeric material to the leading edge of only said flexible blade section between the inboard end section and the general area of the trim tab supported on the blade.

12. A method according to claim 11 wherein the wear resistant polymeric material is an unreinforced elastomer.

13. A method according to claim 12, wherein the wear resistant polymeric material is polyurethane.

14. A method according to claim 11 wherein the method further comprises applying a bond line thickness control medium to the leading edge of the flexible blade section and applying the polymeric material to the thickness control medium.

15. A method according to claim 14 wherein the bond line thickness control medium is a scrim cloth.

16. A method according to claim 14 wherein the bond line thickness control medium comprises glass beads.

17. A method according to claim 11 wherein an epoxy adhesive is employed to achieve securing of the wear resistant polymeric material to the leading edge of only the flexible blade section.

18. A method according to claim 17 wherein the epoxy adhesive is applied to the wear resistant polymeric material and the leading edge of only the flexible blade section prior to securing the wear resistant polymeric material to the leading edge of only the flexible blade section.

19. A method according to claim 11 including removing an existing wear resistant metal strip of the blade from only the flexible blade section prior applying the wear resistant polymeric material to the blade.

20. A rotor blade according to claim 10 wherein the flexible blade section, upon which the wear resistant polymeric material is applied, is continuous in profile and formed of similar material as the outboard flight section.

* * * * *